United States Patent
Ellam et al.

(10) Patent No.: US 11,200,314 B2
(45) Date of Patent: Dec. 14, 2021

(54) RANSOMWARE ATTACK MONITORING

(71) Applicant: HEWLETT-PACKARD DEVELOPMENT COMPANY, L.P., Houston, TX (US)

(72) Inventors: Daniel Ellam, Bristol (GB); Adrian Baldwin, Bristol (GB); Remy Husson, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 283 days.

(21) Appl. No.: 16/087,712

(22) PCT Filed: Dec. 15, 2016

(86) PCT No.: PCT/US2016/066808
§ 371 (c)(1),
(2) Date: Sep. 24, 2018

(87) PCT Pub. No.: WO2018/111271
PCT Pub. Date: Jun. 21, 2018

(65) Prior Publication Data
US 2019/0087572 A1     Mar. 21, 2019

(51) Int. Cl.
*G06F 7/04* (2006.01)
*G06F 21/56* (2013.01)
(Continued)

(52) U.S. Cl.
CPC .......... *G06F 21/561* (2013.01); *G06F 21/12* (2013.01); *G06F 21/554* (2013.01); *G06F 21/56* (2013.01);
(Continued)

(58) Field of Classification Search
CPC ........ G06F 21/12; G06F 21/554; G06F 21/56; G06F 21/561; G06F 21/566; G06F 21/568; G06F 2221/034; G06F 2221/2101
See application file for complete search history.

(56) References Cited

U.S. PATENT DOCUMENTS

| | | | | |
|---|---|---|---|---|
| 7,908,657 B1 * | 3/2011 | Hernacki | ............ | H04L 63/1441 726/23 |
| 8,204,907 B1 * | 6/2012 | Smith | ............ | G06F 16/13 707/783 |

(Continued)

FOREIGN PATENT DOCUMENTS

EP     3038003 A1     6/2016

OTHER PUBLICATIONS

Kharraz et al., "Cutting the Gordian Knot: A Look Under the Hood of Ransomware Attacks", Retrieved from Internet—http://www.eurecom.fr/en/publication/4548/download/rs-publi-4548.pdf, 2015, 20 Pages.

(Continued)

*Primary Examiner* — Gary S Gracia
(74) *Attorney, Agent, or Firm* — Phillips Winchester, LLC

(57) ABSTRACT

Examples associated with ransomware attack monitoring are described. One example includes a monitor module to monitor files stored on the system for sequences of file accesses that match a predefined pattern of file accesses. An investigation module is activated when a number of sequences of file accesses that match the predefined pattern exceeds a first threshold. The investigation module logs actions taken by processes to modify files. A reaction module pauses a set of processes operating on the system when the number of sequences of file accesses that match the predefined pattern exceeds a second threshold. The reaction module then identifies processes associated with a suspected (Continued)

ransomware attack based on the logging performed by the investigation module, and resumes legitimate processes.

15 Claims, 6 Drawing Sheets

(51) Int. Cl.
*G06F 21/12* (2013.01)
*G06F 21/55* (2013.01)
*G06F 7/16* (2006.01)

(52) U.S. Cl.
CPC .......... *G06F 21/566* (2013.01); *G06F 21/568* (2013.01); *G06F 2221/034* (2013.01); *G06F 2221/2101* (2013.01)

(56) References Cited

U.S. PATENT DOCUMENTS

| | | | |
|---|---|---|---|
| 8,856,542 B2 | 10/2014 | Tatarinov et al. | |
| 9,166,993 B1 | 10/2015 | Liu | |
| 9,300,679 B1* | 3/2016 | Martin | H04L 63/1408 |
| 9,317,686 B1* | 4/2016 | Ye | G06F 11/1448 |
| 2009/0070878 A1 | 3/2009 | Wang et al. | |
| 2011/0023118 A1* | 1/2011 | Wright | G06F 11/28 |
| | | | 726/23 |
| 2011/0219450 A1* | 9/2011 | McDougal | H04L 63/1416 |
| | | | 726/23 |
| 2013/0067576 A1* | 3/2013 | Niemela | G06F 21/566 |
| | | | 726/24 |
| 2013/0167231 A1 | 6/2013 | Raman et al. | |
| 2014/0181971 A1* | 6/2014 | Tatarinov | G06F 21/316 |
| | | | 726/23 |
| 2015/0052614 A1* | 2/2015 | Crowell | G06F 21/566 |
| | | | 726/25 |
| 2015/0332048 A1* | 11/2015 | Mooring | G06F 9/45533 |
| | | | 726/1 |
| 2016/0337390 A1* | 11/2016 | Sridhara | G06F 21/566 |
| 2016/0371152 A1* | 12/2016 | Parshin | G06F 21/566 |
| 2016/0378979 A1* | 12/2016 | Kapoor | G06F 21/85 |
| | | | 726/23 |
| 2017/0024561 A1* | 1/2017 | Hajmasan | G06F 21/55 |
| 2017/0034189 A1* | 2/2017 | Powell | H04L 63/1425 |
| 2017/0140156 A1* | 5/2017 | Gu | G06F 21/566 |
| 2018/0007069 A1* | 1/2018 | Hunt | H04L 63/1416 |

OTHER PUBLICATIONS

Kharraz et al., "UNVEIL: A Large-Scale, Automated Approach to Detecting Ransomware", Retrieved from Internet—http://www.ccs.neu.edu/home/mkharraz/publications/unveil-USENIX.pdf, 2016, 16 Pages.

Roeh et al., "For Ransomware Detection, Behavior Beats Signatures", Retrieved from Internet—https://www.extrahop.com/company/blog/2016/ransomware-detection-ransomware-prevention-methods/, May 11, 2016, 8 Pages.

* cited by examiner

RANSOMWARE ATTACK MONITORING

BACKGROUND

Because of the increased potential for profit, malware has been increasing in complexity and sophistication. For example, some older types of malware, after attempting to redistribute themselves, will cripple a host system or cause some other type of disruption or destruction. Today however, attackers' objectives have evolved and newer types of malware have begun to spring up, including ransomware, which largely leave the system itself in working order. Instead, ransomware attacks a user's personal files, encrypting them so that the user cannot retrieve work, pictures, documents, and so forth, that the user has stored on their computer. The user is then prompted to pay a fee (or ransom) to a distributor of the ransomware to unlock the files.

BRIEF DESCRIPTION OF THE DRAWINGS

The present application may be more fully appreciated in connection with the following detailed description taken in conjunction with the accompanying drawings.

DETAILED DESCRIPTION

Systems, methods, and equivalents associated with ransomware attack monitoring are described. Today, ransomware prevention relies on strategies similar to mitigating other types of malware. Antivirus programs are used to prevent delivery and/or operation of malware to begin with. However, this strategy may fail when a malware is able to evade the antivirus program through, for example, social engineering a system user, using a strategy previously unknown to the antivirus program, and so forth. Consequently, it may be desirable to be able to detect a ransomware as it is attacking the system and shut it down. Further, because numerous detection systems for various types of attacks may begin weighing on system resources, it may be desirable for the detection system to use minimal system resources unless signs of a ransomware attack actually begin appearing.

Consequently, ransomware attacks may be detected by monitoring file access patterns of processes running a system. File access patterns may be chains of access types (e.g., create, modify, rename, delete) on individual files. When a number of access chains indicative of a ransomware attack occur within a predefined time window, the system may begin logging information regarding processes that are performing these types of file accesses. If the number of suspicious access chains continues to increase, suspicious processes are paused, checked against the logs, and then restarted if the logs indicate the processes are not associated with the suspected ransomware attack. A user or other security invested entity may then be notified and further restorative action(s) may be taken. As a result, even though process logging and/or suspending processes may impact system usage, because these tasks are only activated when lightweight file access monitoring detects signs of the beginning of a ransomware attack, full encryption of a system's important files may be prevented using techniques that may not noticeably impact normal system usage.

Figure 1:
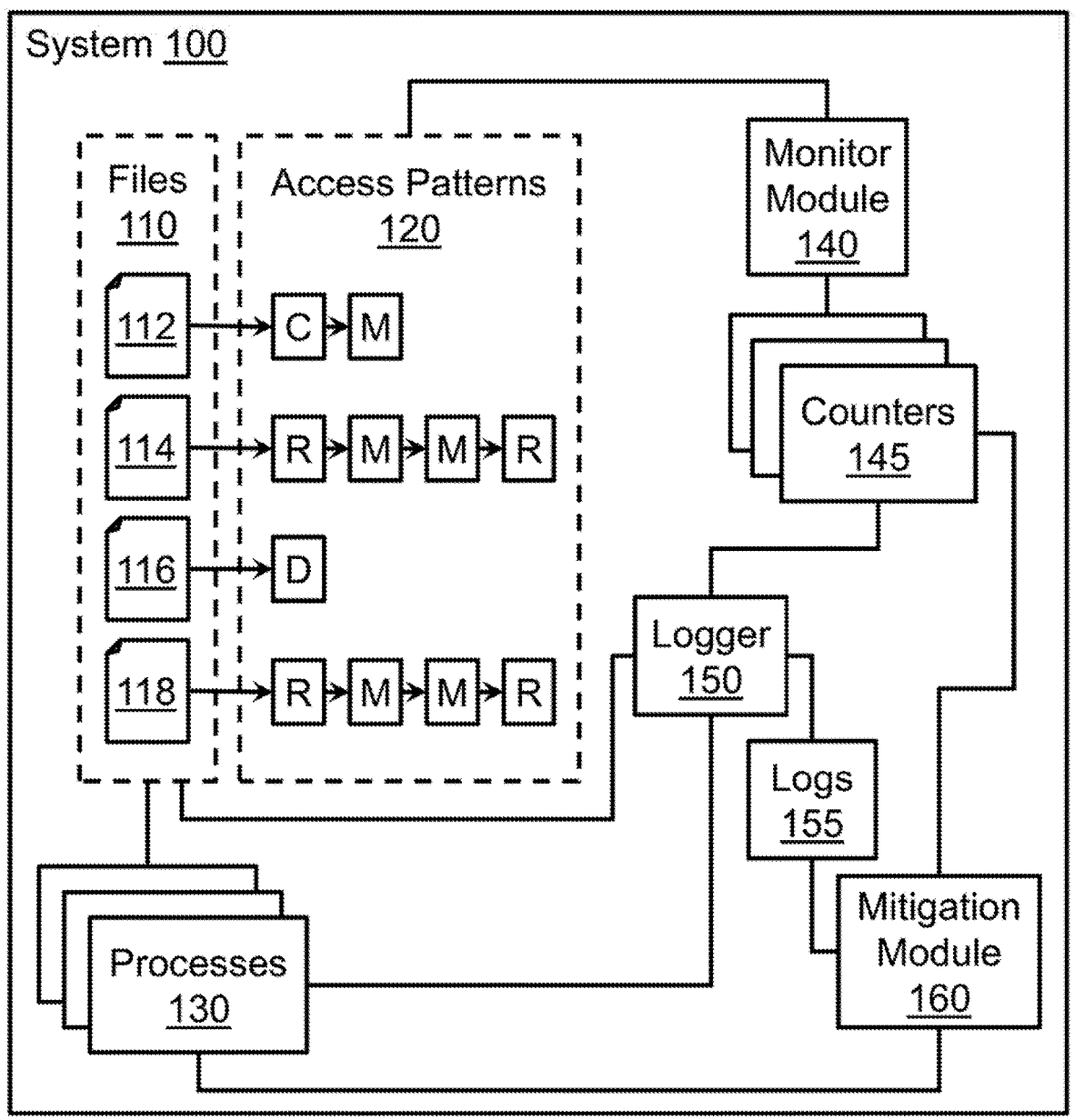
FIG. 1 illustrates an example system associated with ransomware attack monitoring.

FIG. 1 illustrates an example system 100 associated with ransomware attack monitoring. It should be appreciated that the items depicted in FIG. 1 are illustrative examples, and many different systems, devices, and so forth, may operate in accordance with various examples.

FIG. 1 illustrates a system 100. In various examples, system 100 may be a computer, mobile device, or other type of device susceptible to ransomware attacks. As used herein a ransomware is a malicious process that encrypts personal files on a system (e.g., system 100) and then directs a user of the system to pay a fee to have the files decrypted. Here, personal files are files that do not affect the general operation of system 100. By way of illustration, files associated with operation of an operating system of system 100 and/or processes 130 run by system 100 may not be considered personal files. Instead, personal files may include documents (e.g., .doc, .pdf), spreadsheets, presentations, photos, pictures, emails, and so forth that belong to a user of system 100.

To hinder ransomware attacks on files 110 on system 100, it may be desirable to detect when the ransomware attacks are occurring on system 100. Consequently, a monitor module 140 may keep track of access patterns 120 of files 110. Because some operating systems create events for file accesses that other processes can listen for, tracking access patterns 120 may use few additional system resources. As used herein, an access pattern for a file may describe a sequence of recent file accesses types for a file. Types of file access may include, for example, file creations (C), file modifications (M), file renames (R), and file deletions (D), and so forth. Specifically, monitor module 140 may keep counters 145 for a number of files 110 that have recently been accessed according to known patterns exhibited by ransomware. However, because occasionally these malicious patterns are also associated with non-malicious application behavior, especially when individual instances of patterns are detected infrequently, monitor module 140 may prevent false positive alerts by waiting until a threshold number of a type of pattern has been detected within a time window before escalating.

In the example illustrated in system 100, four files 112, 114, 116, and 118 have been recently modified, and their respective access patterns 120 are shown. In practice, access patterns 120 may not be stored, and tracking access patterns 120 may involve examining which files 110 are loaded into memory and examining how they are changed. In the example illustrated in FIG. 1, the access pattern 120 of file 112 is a creation action followed by a modify action. The action pattern 120 of files 114 and 118 are a rename action followed by two modify actions and another rename action. File 116 has been deleted.

Access patterns 120 may be tracked by monitor module 140 using a series of counters 145. For example, monitor module 140 may use a first counter 145 to track R-M-M-R access patterns, a second counter 145 to track C-M access patterns, and a third counter 145 to track deletions. A counter 145 (or combination of counters) exceeding a first threshold may be a sign that system 100 is experiencing a ransomware attack. However, before taking remedial actions, it may be desirable to perform additional analysis so that actions taken target processes 130 that are likely to be associated with the suspected ransomware attack.

Consequently, upon a counter 145 exceeding the first threshold, logger 150 may be activated to begin generating logs 155 of actions taken by processes 130 that manipulate files 110. In some examples, the initiation of logger 150 may use processing resource that, in combination with other processes 130, begin affecting the performance of system 100, hence the targeted initiation of logger 150. In addition to recording information regarding actions taken by processes 130 to modify files 110, logger 150 may check for other signs associated with ransomware attacks including, for example, modification of canary files, deletion of shadow copies of files, changing of file extensions 110 to an extension known to be associated with ransomware (e.g., ".locked"), and so forth. Canary files may be, for example, files created in association with an antivirus or other malware prevention process that, if modified, indicate the presence and/or operation of a malware on a system. Shadow copies of files may be backups of files from which an older version of a document may be restored.

If the counter 145 tracking the signs of the ransomware attack continues to increase and exceeds a second threshold, system 100 may have increased confidence that it is experiencing the ransomware attack. At this point, mitigation module 160 may be activated to begin taking remedial actions against the suspected ransomware attack. First, mitigation module 160 may suspend suspicious processes 130 that may be causing behaviors associated with the suspected ransomware attack. Suspicious processes 130 may include, recently initiated processes 130, processes 130 that are associated with increases to the counter 145 indicating the occurrence of the suspected ransomware attack, processes 130 initiating processes 130 associated with increases to that counter 145, processes 130 associated with other signs of the suspected ransomware attack (e.g., modifying canary files, deleting shadow copies), and so forth. Mitigation module 160 may then begin using logs 155 to narrow down the suspicious processes 130 associated with the suspected ransomware attack. For example, mitigation module 160 may determine that a recently initiated process 130 is not associated with the suspected ransomware attack based on the fact that that process 130 has not modified a file 110 in a manner that increased a counter 145. In other examples, mitigation module 160 may have a known whitelist of certain processes 130 that are known to be non-malicious despite exhibiting behaviors that trigger counters 145. For example, some known compression or encryption processes 130 may exhibit similar behaviors to ransomware when modifying a batch of files 110.

Once a process 130 has been identified as safe, mitigation module 160 may resume that process 130. This may reduce impacts of the ransomware mitigation process noticeable to a user of system 100. Once mitigation module 160 has finished resuming processes 130 it is certain are safe, mitigation module 160 may proceed to alert an entity invested in the security of system 100 of the attack. The entity may be, for example, a user of system 100, an information technology department of a company operating system 100, and so forth. The entity may be notified regarding details of the suspected ransomware attack, including, for example, processes 130 involved, other details of the suspected ransomware attack (e.g., deletion of canary files), and so forth. The entity may also be given one or more options on how to react to the suspected ransomware attack. These options may include terminating and/or quarantining processes 130 associated with the ransomware attack, resuming the processes 130 because the processes 130 were identified as a false positive, and so forth.

As discussed above, many non-malicious processes 130 may occasionally, modify a file 110 in a manner that generates an access pattern 120 that is tracked by a counter 145. Consequently, it may be appropriate to periodically decay counters 145 so that logger 150 and/or mitigation module 160 are triggered during bursts of detections of potentially malicious access patterns 120. In some examples, counters 145 may be decayed based on a time since individual instances of a detection of an access pattern 120. In other examples, counters 145 may be decayed or reset after an access pattern 145 associated with a counter is not detected for a given period of time.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
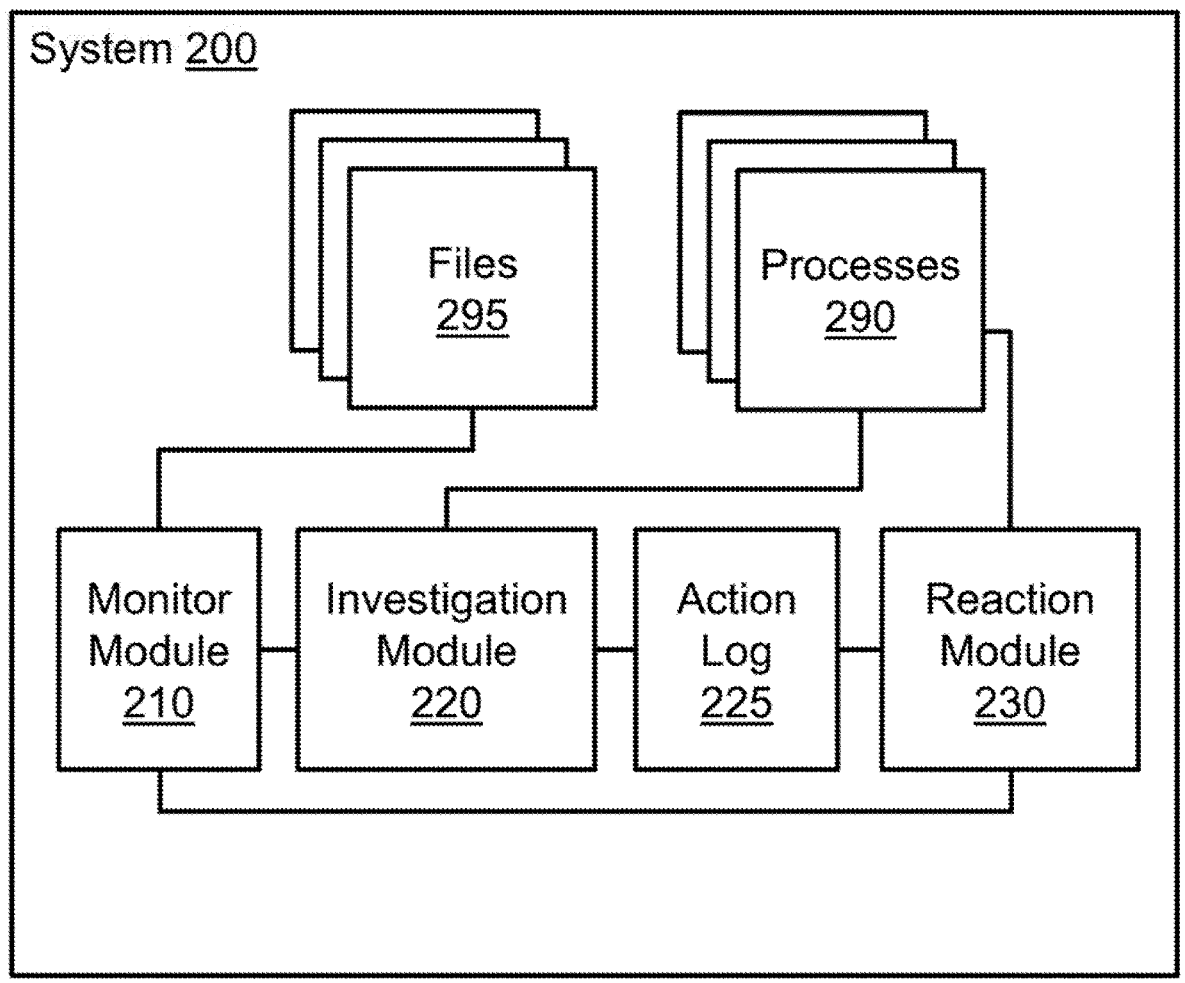
FIG. 2 illustrates another example system associated with ransomware attack monitoring.

FIG. 2 illustrates an example system 200 associated with ransomware attack monitoring. System 200 includes a monitor module 210. Monitor module 210 may monitor files 295 stored on system 200. Files 295 may be monitored for sequences of file accesses that match a predefined pattern. In various examples, the predefined pattern may apply to a single file, related files, arbitrary files, and so forth. Related files may be, for example, files sharing a directory, files sharing a memory location, files associated with a specific file type, files sharing similar names, and so forth. While examples described herein discuss a single predefined pattern, monitor module 210 may be monitoring files 295 for several differing predefined patterns of file accesses.

System 200 also includes an investigation module 220. Investigation module 220 may log actions taken by processes 290 to modify files 295. This may create action log 225. Logged actions may include, for example, accesses to files 295 made by processes 290, extensions of files 295 accessed by processes 290, and so forth. Investigation module 220 may be activated when a number of sequences of file accesses that match the predefined pattern exceeds a first threshold.

System 200 also includes a reaction module 230. Reaction module 230 may pause several processes 290. Reaction module 230 may then identify processes 290 associated with the suspected ransomware attack using action log 225 created by investigation module 220. Reaction module 230 may then resume legitimate processes 290. In various examples, a legitimate process may be distinguished from a process associated with a suspected ransomware attack based on whether a process is taking actions that show up in action log 225, whether a process is associated with a sequence of file accesses associated with a predefined pattern, whether a process is a known secure process (e.g., associated with an operating system running on system 200), how recently the process was initiated, and so forth.

In some examples, reaction module 230 may be activated when monitor module 210 determines that the number of sequences of file accesses that match the predefined pattern exceeds a second threshold. In other examples, reaction module 230 may be activated when monitor module 210 and/or investigation module 220 detect, for example, a modification of a shadow copy of a file, a modification of a canary file, modifications of related files, a known malicious attribute in a recently modified file, and so forth.

In some examples, system 200 may also include an alert module (not shown). The alert module may notify a user of system 200, or some other entity invested in the security of system 200, regarding the suspected ransomware attack. Alert module may also take an action in response to an instruction from this user or entity. The action may be, for example, terminating and/or quarantining processes 290 associated with the suspected ransomware attack, restarting the processes 290, restoring a file from a backup, and so forth.

Figure 3:
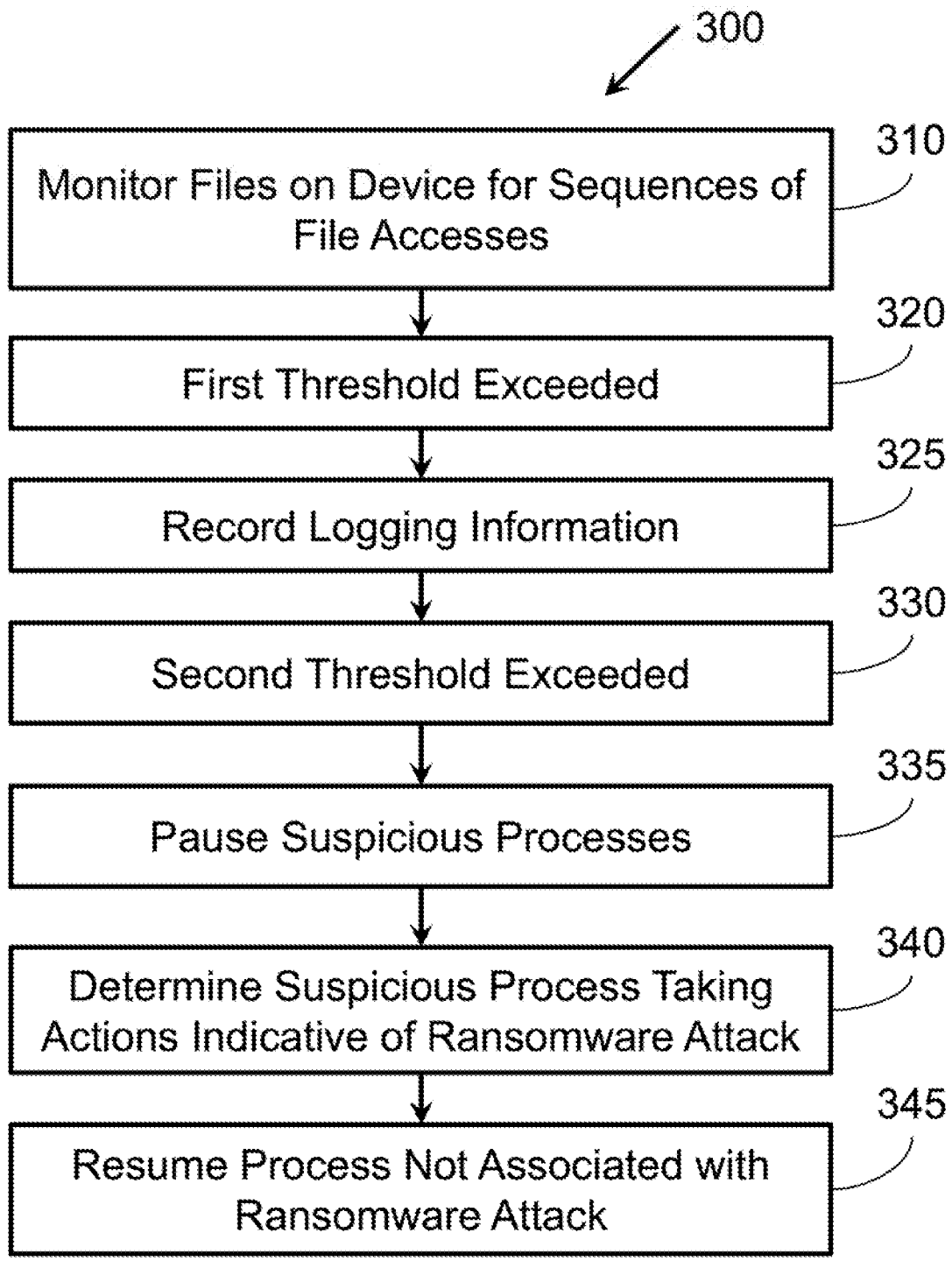
FIG. 3 illustrates a flowchart of example operations associated with ransomware attack monitoring.

FIG. 3 illustrates an example method 300 associated with malware attack monitoring. Method 300 may be embodied on a non-transitory processor-readable medium storing processor-executable instructions. The instructions, when executed by a processor, may cause the processor to perform method 300. In other examples, method 300 may exist within logic gates and/or RAM of an application specific integrated circuit (ASIC).

Method 300 includes monitoring files at 310. The files may be stored on a device. The files may be monitored for sequences of file accesses that match a predefined pattern. The files may include, for example, a user's personal files such as documents, pictures, spreadsheets, and so forth. The predefined patterns may be specifically tailored to target file access patterns by known types of ransomware.

Method 300 also includes determining when a number of sequences of file accesses match the predefined pattern exceeds a first threshold at 320. When the first threshold is exceeded, method 300 includes record logging information at 325. The logging information may describe actions taken by processes to modify files. These actions may describe which processes are creating, renaming, deleting, and modifying files, and so forth.

Method 300 also includes determining when the number of sequences of file accesses exceeds a second threshold at 330. When the second threshold is exceeded, method 300 includes pausing suspicious processes on the device at 335. A process may be considered a suspicious process based on, for example, a recent file access sequence performed by the process, a duration the process has been active, what types of files the process has recently accessed, and so forth.

Method 300 also includes determining a suspicious process that is taking actions indicative of a ransomware attack at 340. The suspicious process may be determined based on the logging information gathered at action 325. Actions indicative of a ransomware attack may include, for example, deleting shadow copies of files, changing file to a known malicious file type, modifying a canary file, and so forth.

Method 300 also includes resuming a suspicious process at 345. This suspicious process may be resumed because it is determined, based on its actions, that the process is not associated with the suspected ransomware attack. By way of illustration, a process that has not accessed a file that triggered an increase of a counter tracking the number of sequences of file access may be cleared to resume operating. In another example, a known whitelisted process may also be resumed after the process has been verified and/or authenticated as the whitelisted process.

Figure 4:
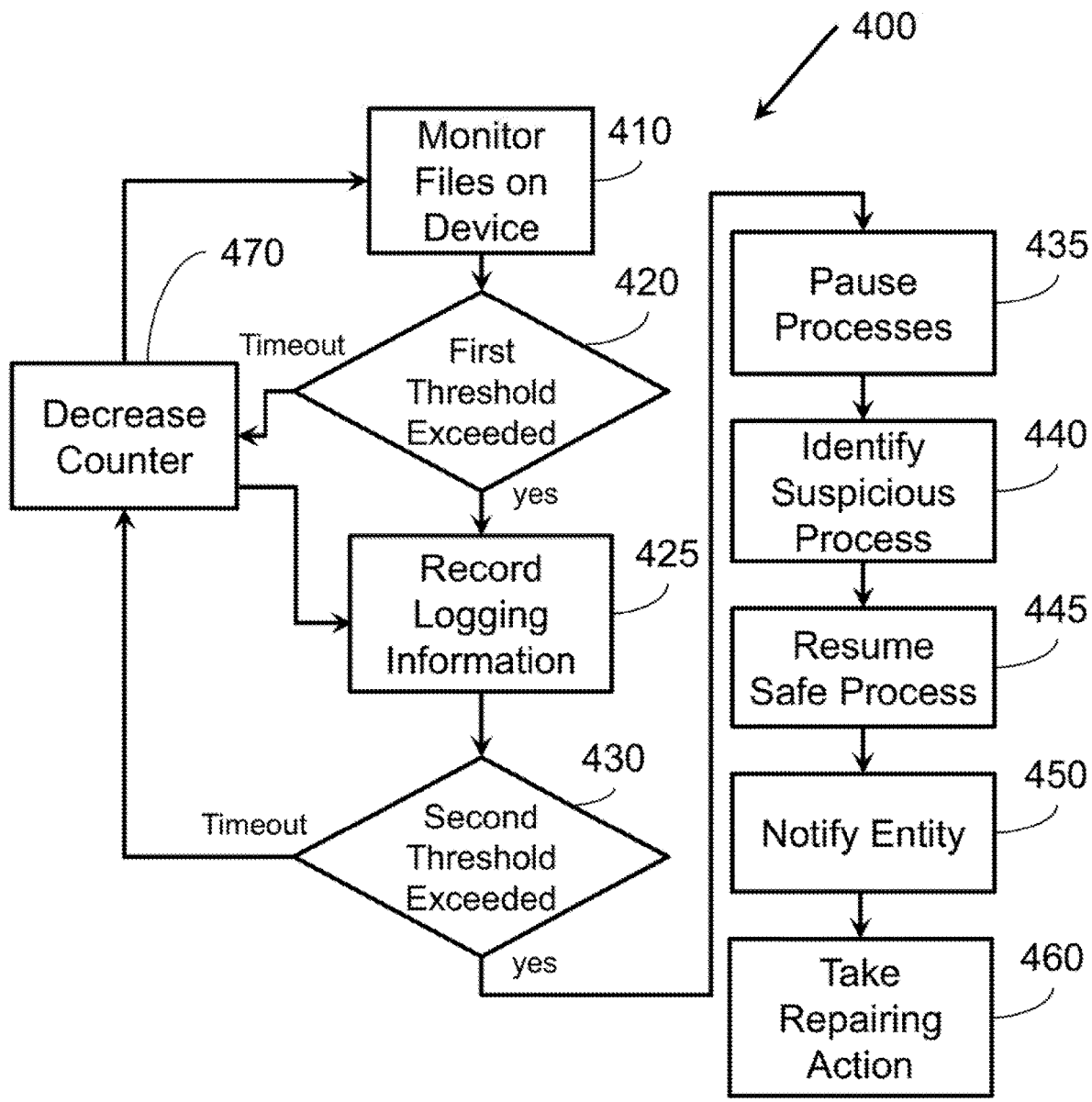
FIG. 4 illustrates another flowchart of example operation associated with ransomware attack monitoring.

FIG. 4 illustrates a method 400 associated with ransomware attack monitoring. Method 400 includes several actions similar to those described above with reference to method 300 (FIG. 3). For example, method 400 includes monitoring files on a device for sequences of file accesses that match a predefined pattern at 410, determining whether a number of sequences of file accesses matching the predefined pattern exceeds a first threshold at 420, recording logging information at 425, determining whether the number of sequences of file accesses matching the predefined pattern exceeds a second threshold at 430, pausing processes at 435, identifying a suspicious process associated with a suspected ransomware attack at 440, and resuming safe processes at 445.

Method 400 also includes notifying an entity regarding the suspected ransomware attack at 450. The entity may be, for example, a user, a company that owns a system performing method 400, a security application, and so forth. Information given may include the name of the process, whether any additional signs of a ransomware attack have been detected (e.g., a modification of a canary file), and so forth. Method 400 also includes taking a repairing action at 460. The repairing action taken may be based on a response from the entity. The repairing action may be, for example, resuming the member of the set of suspicious processes that is taking actions indicative of the suspected ransomware attack, terminating the member of the set of suspicious processes that is taking actions indicative of the suspected ransomware attack, restoring a file from a backup, and so forth.

Method 400 also includes decreasing a counter at 470. The counter may be used to keep track of the number of sequences of file accesses that match the predefined pattern. The counter may be decremented after a predetermined period of time after an occurrence of the sequence of file accesses that matches the predefined pattern, or if a file whose accesses currently match that of a suspicious sequence receives further events making its file access sequence different.

Figure 5:
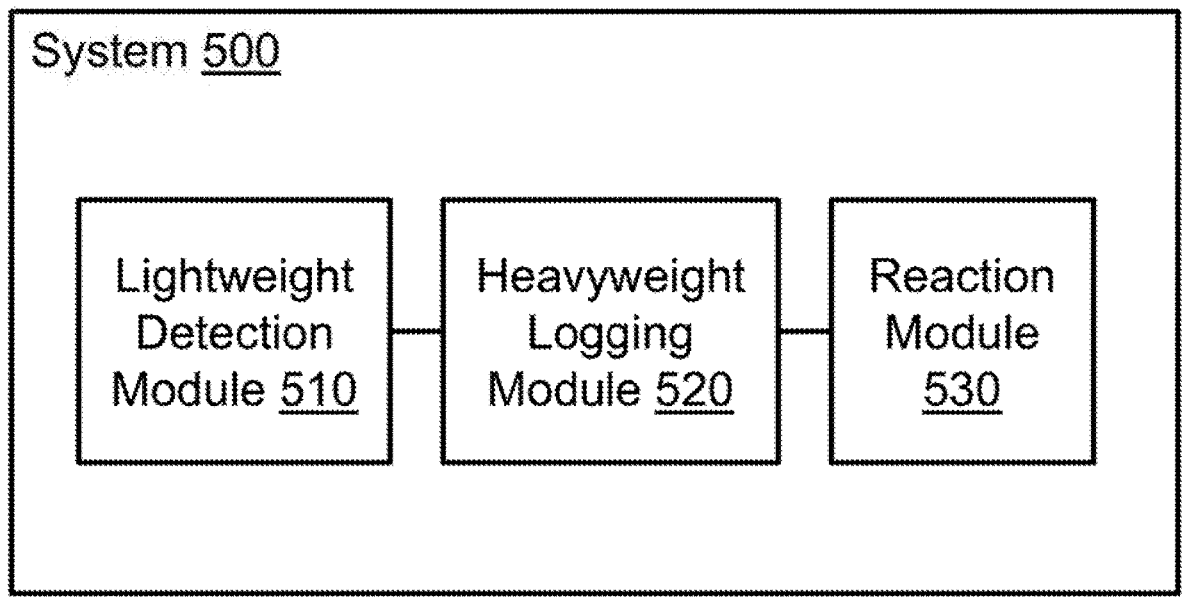
FIG. 5 illustrates another example system associated with ransomware attack monitoring.

FIG. 5 illustrates a system 500 associated with ransomware attack monitoring. System 500 includes a lightweight detection module 510. Lightweight detection module 510 may monitor system 500 for a likelihood the system is experiencing a ransomware attack. Lightweight detection module 510 may use a first level of system resources. The first level of system resources may be a level of system resource that is unlikely to affect performance of system 500 in a manner that is noticeable by a user of system 500. In one example, lightweight detection module 510 may monitor file access patterns of processes operating on system 500.

System 500 also includes a heavyweight logging module 520. Heavyweight logging module 520 may store information regarding suspicious processes running on system 500 while lightweight detection module 510 indicates that the likelihood system 500 is experiencing the ransomware attack is above a first threshold. The likelihood the system is experiencing the ransomware attack may be measured based on a number of files whose recent access sequences match a predefined pattern. The likelihood the system is experiencing the ransomware attack may also be measured based on, for example, deletion of a shadow copy of a file, modification of a canary file, changing of a file to a known malicious file type, and so forth. Storing information regarding suspicious processes may use a second of system resources that is greater than the first level of system resources.

System 500 also includes a reaction module 530. When lightweight detection module 510 indicates that the likelihood system 500 is experiencing a ransomware attack is above a second threshold, reaction module 530 may take measures to stop and/or mitigate the suspected ransomware attack. For example, reaction module 530 may suspend suspicious processes. Reaction module 530 may also identify a suspicious process associated with the suspected ransomware attack using the information regarding the suspicious processes gathered by heavyweight logging module 520. Reaction module 530 may also resume other suspended processes identified as not being associated with the suspected ransomware attack. In some examples, identifying the suspicious process associated with the suspected ransomware attack may use a third level of system resources that is greater than the second level of system resources.

In some examples, system 500 may include an alert module (not shown). Alert module may notify an entity invested in the security of system 500 regarding the suspicious process potentially associated with the suspected ransomware attack. The entity may be, a user, a process, a company, and so forth. Alert module may also take an action in response to an instruction from the entity. The action may be, for example, terminating the suspicious process, reactivating the suspicious process, restoring a file from backup, and so forth.

Figure 6:
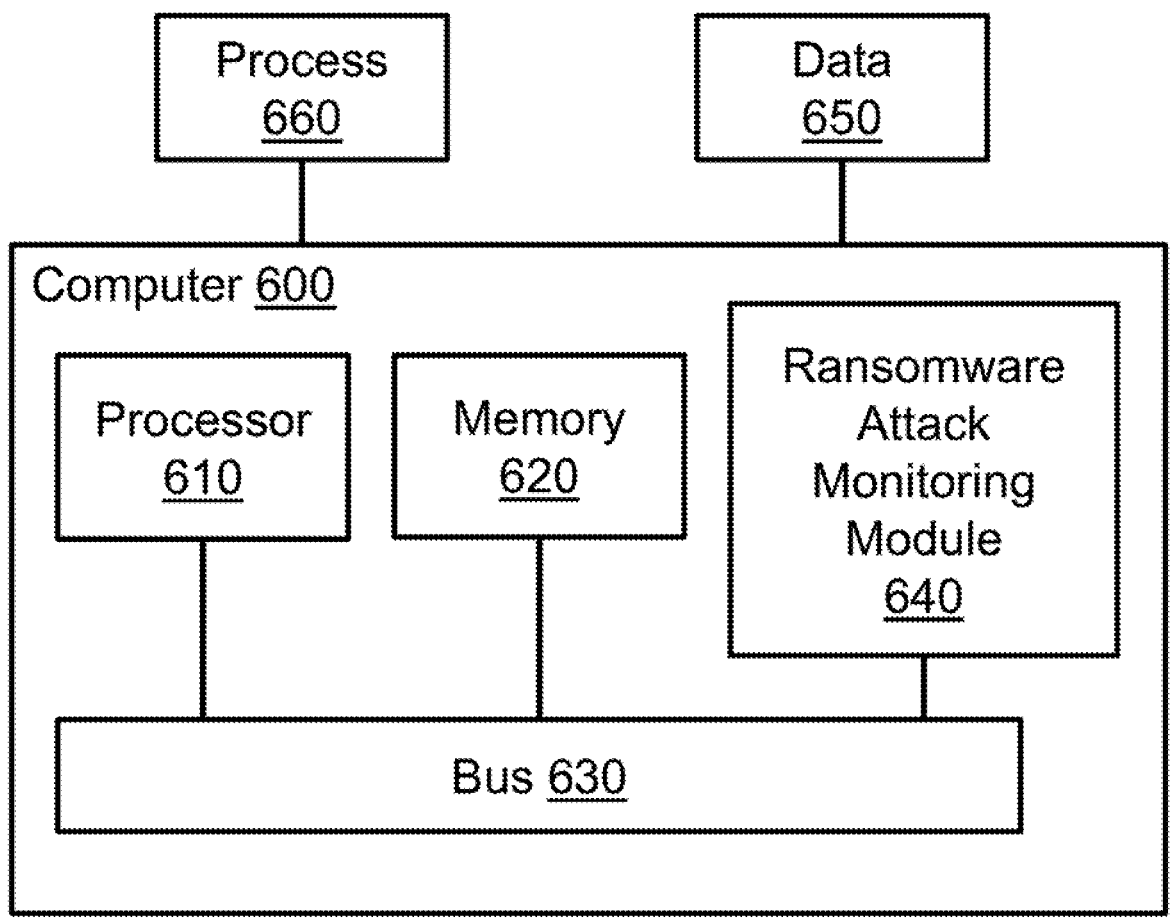
FIG. 6 illustrates an example computing device in which example systems, and methods, and equivalents, may operate.

FIG. 6 illustrates an example computing device in which example systems and methods, and equivalents, may operate. The example computing device may be a computer 600 that includes a processor 610 and a memory 620 connected by a bus 630. Computer 600 includes a ransomware attack monitoring module 640. Ransomware attack monitoring module 640 may perform, alone or in combination, various functions described above with reference to the example systems, methods, and so forth. In different examples, ransomware attack monitoring module 640 may be implemented as a non-transitory computer-readable medium storing processor-executable instructions in hardware software, firmware, an application specific integrated circuit, and/or combinations thereof.

The instructions may also be presented to computer 600 as data 650 and/or process 660 that are temporarily stored in memory 620 and then executed by processor 610. The processor 610 may be a variety of processors including dual microprocessor and other multi-processor architectures. Memory 620 may include non-volatile memory (e.g., read only memory) and/or volatile memory (e.g., random access memory). Memory 620 may also be, for example, a magnetic disk drive, a solid state disk drive, a floppy disk drive, a tape drive, a flash memory card, an optical disk, and so on. Thus, memory 620 may store process 660 and/or data 650. Computer 600 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A system, comprising:
a monitor module with a lightweight detection module to:
identify personal user files in a set of files on the system, wherein the set of files includes personal user files and system files,
exclude files not identified as personal user files from monitoring by the lightweight detection module, such that at least the system files are excluded from monitoring by the lightweight detection module, and
monitor the personal user files stored on the system using a first level of system resources to not noticeably impact system usage for sequences of file accesses that match a predefined pattern of file accesses potentially associated with a suspected ransomware attack;
an investigation module to log actions taken by processes to modify the personal user files, where the investigation module is activated when a number of sequences of file accesses that match the predefined pattern exceeds a first threshold; and
a reaction module to, when the number of sequences of file accesses that match the predefined pattern exceeds a second threshold, consume a second level of system resources that noticeably impacts system usage to:
pause a set of processes being executed by a hardware processor of the system, wherein the paused set of processes includes paused legitimate processes and illegitimate processes,
identify paused processes associated with the suspected ransomware attack based on the logging performed by the investigation module, and
resume execution of legitimate processes by the hardware processor,
wherein the monitor module, the investigation module, and the reaction module are executed by the hardware processor of the system.

2. The system of claim 1, comprising an alert module to notify a user of the system regarding the suspected ransomware attack, and to take an action in response to an instruction from the user.

3. The system of claim 1, where the reaction module is triggered when one of the investigation module and the monitor module detects one of, a modification of a shadow copy of a personal user file, a modification of a personal user canary file, modifications of related personal user files, and a known malicious attribute in a recently modified personal user file.

4. The system of claim 1, where the monitor module tracks multiple predefined patterns of file accesses.

5. A method, comprising:
identifying personal user files stored on a device for monitoring using a first level of system resources;
excluding files not identified as personal user files from monitoring using the first level of system resources, such that at least system files are excluded from monitoring using the first level of system resources;
monitoring, via a monitor module executed on a hardware processor that consumes the first level of system resources, the personal user files stored on the device for sequences of file accesses that match a predefined pattern of file accesses of personal user files potentially associated with a ransomware attack;

when a number of sequences of file accesses that match the predefined pattern exceeds a first threshold:
  recording logging information regarding actions taken by processes to modify personal user files; and
when the number of sequences of file accesses that match the predefined pattern exceeds a second threshold, consuming a second level of system resources by:
  pausing a set of suspicious processes operating on the device, including illegitimate and legitimate processes operating on the device;
  determining, from the logging information, a member of the set of paused suspicious processes that is taking actions indicative of the ransomware attack; and
  resuming a member of the set of suspicious processes that is not associated with the ransomware attack.

6. The method of claim 5, comprising:
notifying an entity regarding the ransomware attack; and
taking a repairing action based on a response from the entity.

7. The method of claim 6, where the repairing action is one of:
  resuming a member of the set of suspicious processes that is taking actions indicative of a ransomware attack,
  terminating a member of the set of suspicious processes that is taking actions indicative of a ransomware attack, and
  restoring a personal user file from a backup.

8. The method of claim 5, comprising decreasing a counter recording the number of sequences of file accesses that match the predefined pattern after a predetermined period of time after an occurrence of the sequence of file accesses that matches the predefined pattern.

9. The method of claim 5, where the actions that are indicative of a ransomware attack include at least one of, deleting shadow copies of personal user files, changing personal user files to a known malicious file type, and modifying a personal user canary file.

10. The method of claim 5, where a process is considered a suspicious process based on at least one of, a recent file access sequence performed by the process, a duration the process has been active, and what types of files the process has recently accessed.

11. A system, comprising:
  a lightweight detection module to monitor personal user files on the system for a likelihood the system is experiencing a ransomware attack, where the lightweight detection module uses a first level of system resources with low impact on system usage due, at least in part, to the exclusion of system files from monitoring by the lightweight detection module;
  a heavyweight logging module to store information regarding suspicious processes while the lightweight detection module indicates that the likelihood the system is experiencing the ransomware attack is above a first threshold, where storing information regarding suspicious processes uses a second level of system resources that is greater than the first level of system resources; and
  a reaction module to, when the lightweight detection module indicates that the likelihood the system is experiencing the ransomware attack is above a second threshold, impact system usage to:
    suspend suspicious processes, including legitimate processes and illegitimate processes,
    identify a suspicious process potentially associated with the ransomware attack using the information regarding the suspicious processes, and
    resume suspended processes unassociated with the ransomware attack,
  wherein the lightweight detection module, the heavyweight logging module, and the reaction module are executed by a hardware processor of the system.

12. The system of claim 11, comprising an alert module to notify an entity invested in the security of the system regarding the suspicious process potentially associated with the ransomware attack and to take an action in response to an instruction from the entity.

13. The system of claim 11, where the likelihood the system is experiencing the ransomware attack is measured based on a number of personal user files whose recent access sequences match a predefined pattern.

14. The system of claim 11, where the likelihood the system is experiencing the ransomware attack is measured based on at least one of deletion of a shadow copy of a personal user file, modification of a personal user canary file, and changing of a personal user file to a known malicious tile type.

15. The system of claim 11, where identifying the suspicious process potentially associated with the ransomware attack uses a third level of system resources that is greater than the second level of system resources.

* * * * *